United States Patent [19]
Sugawara

[11] Patent Number: 5,926,316
[45] Date of Patent: Jul. 20, 1999

[54] PROJECTION LENS SYSTEM

[75] Inventor: Saburo Sugawara, Kawasaki, Japan

[73] Assignee: Canon Kabushiki Kaisha, Tokyo, Japan

[21] Appl. No.: 08/365,319

[22] Filed: Dec. 28, 1994

Related U.S. Application Data

[63] Continuation of application No. 08/034,486, Mar. 19, 1993, abandoned.

[30] Foreign Application Priority Data

Mar. 25, 1992  [JP]  Japan .................................... 4-067317

[51] Int. Cl.$^6$ .................................................. G02B 27/64
[52] U.S. Cl. ......................................... 359/557; 359/554
[58] Field of Search ..................... 359/381, 696, 359/793, 794, 813, 650, 196, 649–651, 676–680, 691–692, 554–557

[56] References Cited

U.S. PATENT DOCUMENTS

| | | | |
|---|---|---|---|
| 4,387,970 | 6/1983 | Brueggemann | 359/813 |
| 4,564,269 | 1/1986 | Uehara | 359/650 |
| 4,771,302 | 9/1988 | Hamada et al. | |
| 4,909,615 | 3/1990 | Ueda | 359/680 |
| 4,978,205 | 12/1990 | Sato | 359/557 |
| 5,000,549 | 3/1991 | Yamazaki et al. | 359/557 |
| 5,096,288 | 3/1992 | Yano et al. | 353/69 |
| 5,168,403 | 12/1992 | Omeda et al. | 359/557 |
| 5,245,478 | 9/1993 | Luecke | 359/557 |
| 5,249,079 | 9/1993 | Umeda | 359/557 |
| 5,592,331 | 1/1997 | Eastcott | 359/557 |
| 5,623,364 | 4/1997 | Morooka | 359/557 |

FOREIGN PATENT DOCUMENTS

| | | | |
|---|---|---|---|
| 7039 | 1/1980 | European Pat. Off. | 359/630 |
| 6190584 | 5/1986 | Japan . | |

*Primary Examiner*—Thong Nguyen
*Attorney, Agent, or Firm*—Fitzpatrick, Cella, Harper & Scinto

[57] ABSTRACT

A varifocal projection lens system comprising a first lens group of a positive refractive power that is provided closer to a screen, and a second lens group of a positive refractive power that is fixed in a position closer to an image field. To adjust projection of an image displayed by the display device onto the screen, the first lens group is moved and tilted with respect to the optical axis of the second lens group. The projection lens system also satisfies the expression $0.01 < D/fw < 0.5$ where f2 is the focal length of the entire system at the wide-angle end, and D is the distance between the front lens surface of the second lens group and the image field.

13 Claims, 7 Drawing Sheets

16.5mm Shift ↓
2.5° filt

16.5mm Shift
1.3° tilt

PROJECTION LENS SYSTEM

This application is a continuation of application Ser. No. 08/034,486 filed Mar. 19, 1993, now abandoned.

BACKGROUND OF THE INVENTION

1. Field of the Invention

The present invention relates to a varifocal projection lens system for projecting an original image field, for example, an image produced by a liquid crystal display, onto a screen.

2. Description of the Related Art

Figure 5A:
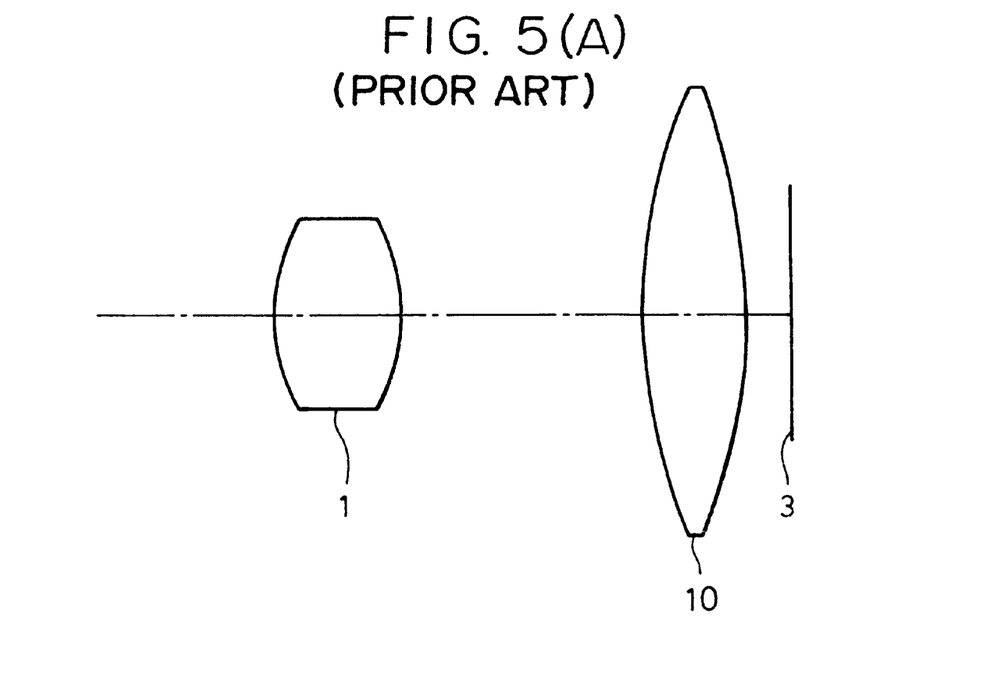
FIGS. 5(A) and (B) illustrate the basic construction and operation of a shift-type projection lens system according to a prior art.
Figure 5B:
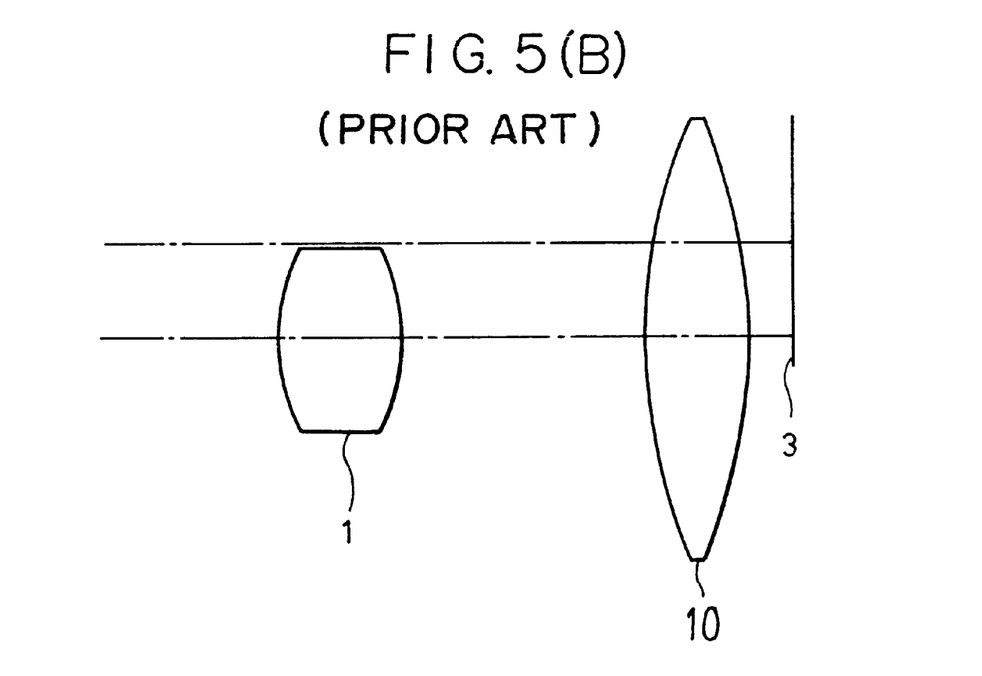

In order to project an original image produced by, e.g., a liquid crystal display, onto a screen which is placed above or below the optical axis of a projection lens apparatus, it is known to use an apparatus for shifting the optical axis of the projection optical system up or down from the center of the original image without changing the directions of the optical axis, as shown in FIGS. 5(A) and 5(B). FIGS. 5(A) and 5(B) illustrate one known arrangement of an optical system where the optical axis is not shifted from the center of the original image 3 and where the optical axis is shifted therefrom, respectively. FIGS. 5(A) and 5(B) each further show a projection lens 1 and a condenser lens 10. The condenser lens 10 directs the largest-possible amount of light traveling in parallel with the optical axis from the original image 3 to the projection lens 1.

However, that known apparatus requires a substantially large condenser lens in order to prevent a vignetting (or eclipse) by the condenser lens. Another problem of that known apparatus is that the mechanism required for moving both the projection lens 1 and the condenser lens 10 without changing their relative positions is substantially large. Further, if the optical axis is shifted, the brightness of an edge portion of the image field is reduced.

Japanese Patent Application Laid-open No. 61-90584 illustrates a projection apparatus that employs a polarizing beam splitter and a prism. However, the polarizing beam splitter and the prism cause the apparatus to be large and heavy, thus impeding the portability thereof. Further, the machining and polishing required for the prism adds substantial processing hours and costs.

SUMMARY OF THE INVENTION

The present invention is intended to eliminate the above-described problems of the known art. Accordingly, an object of the present invention is to provide a shift-type, varifocal projection lens system comprising two lens groups which can utilize an optimum amount of incident light and still permit a small and light projection apparatus that is of low cost.

Further objects, features and advantages of the present invention will become apparent from the following description of the preferred embodiments with reference to the attached drawings.

DESCRIPTION OF THE PREFERRED EMBODIMENTS

The preferred embodiments of the present invention will be described hereinafter with reference to FIGS. 1(A) to 4(B).

Figure 1A:
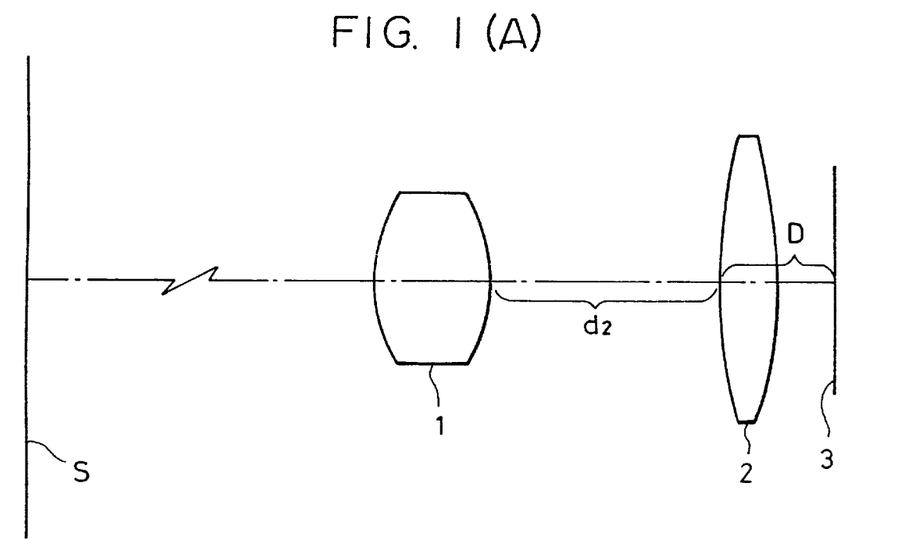
FIGS. 1(A) and 1(B) illustrate the basic construction and operation of the projection lens system of the present invention.
Figure 1B:
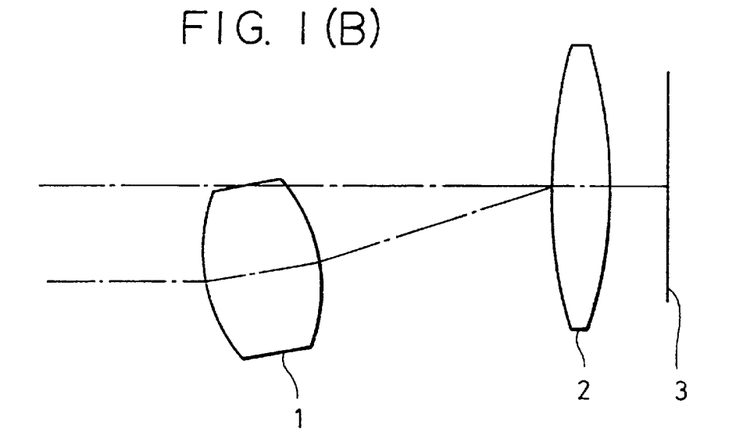

FIGS. 1(A) and 1(B) schematically illustrate an embodiment of the present invention, basically comprising: a first lens group 1; a second lens group 2 which typically is a stationary condenser lens group; an original image 3 (the short-distance conjugate) that is produced, for example, by a liquid crystal display; and a screen S (the long-distance conjugate). FIG. 1(A) illustrates the lens arrangement when the first lens group 1 is not shifted. FIG. 1(B) illustrates the lens arrangement when the first lens group 1 has been shifted so as to project the original image 3 onto a screen S that is placed at a predetermined position. As shown in FIG. 1(B), the first lens group 1 has been shifted by a movement that is perpendicular to the optical axis of the second lens group 2 and a counterclockwise tilt with respect to the same optical axis.

Figure 2:
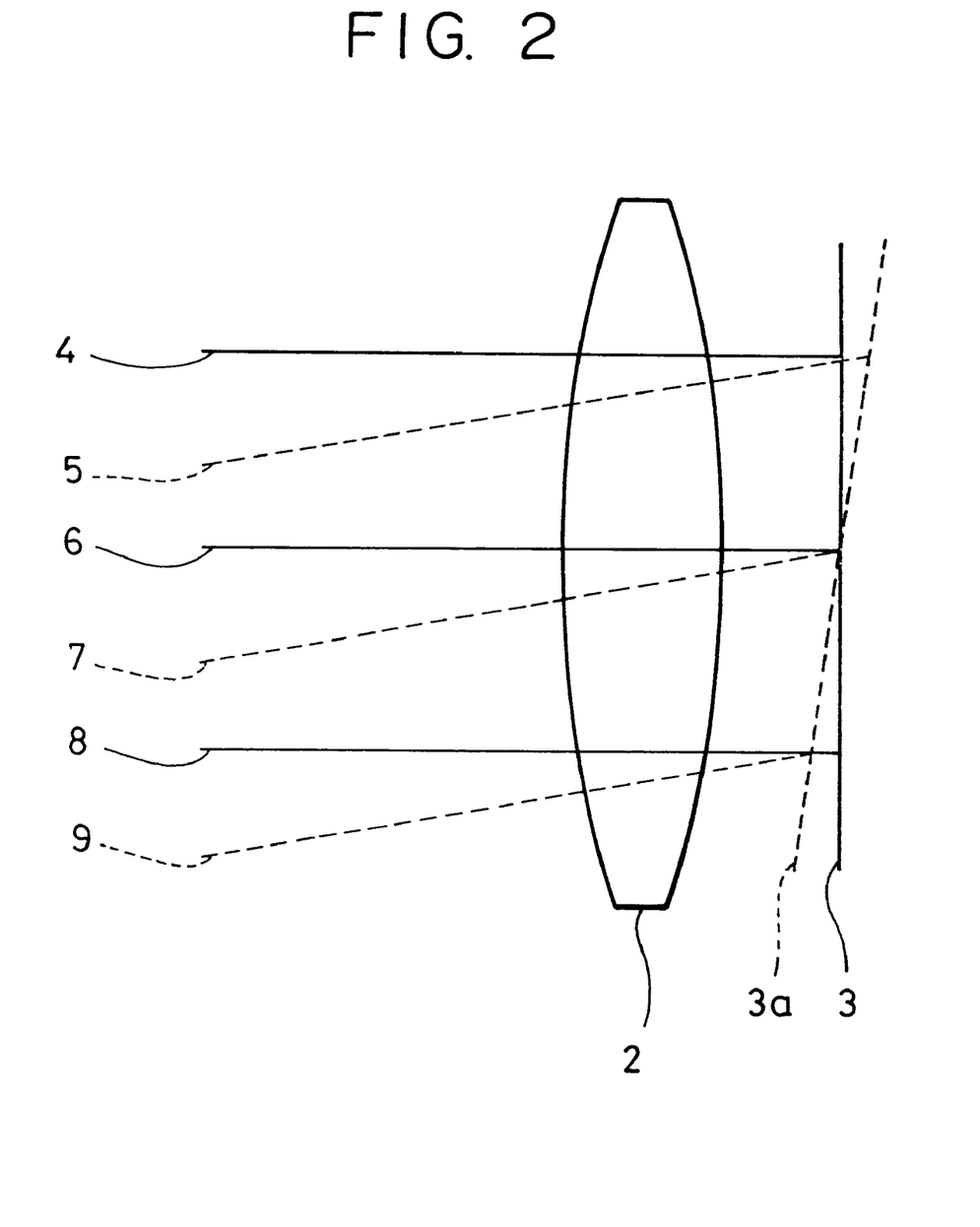
FIG. 2 is a schematic illustration to further illustrate the principles of the present invention.

If the first lens group 1 were to be shifted from the position shown in FIG. 1(A) only by a move perpendicular to the optical axis of the second lens group 2, an edge portion of the projected image would become out of focus because the image field will tilt when the first lens group 1 is thus shifted, as shown schematically in FIG. 2. Then the first lens group 1 is shifted down from the optical axis, the light beams that were incident on the second lens group 2 will be replaced by corresponding light beams. For example, a light beam 4 that was incident on an upper portion of the second lens group 2 is replaced by a light beam 5 and, the glass thickness along the light path is increased, thus shifting the focal position away from the second lens group 2 (or to the right in FIG. 2). A light beam 6 that was incident on the center of the second lens group 2 then is replaced by a light beam 7. Because this replacement does not cause a substantial change in the glass thickness along the light path, the focal position remains substantially the same, as shown in FIG. 2. A light beam 8 that was incident on a lower portion of the second lens group 2 then is replaced by a light beam 9 and, the glass thickness along the new light path is reduced, thus shifting the focal position toward the second lens group 2 (or to the left in FIG. 2). Hence, as shown in FIG. 2, the image field 3a is thus tilted if the first lens group 1 is shifted only by moving it perpendicularly to the optical axis.

According to the present invention, to offset such a tilt of the image field, the first lens group 1 is shifted down from the optical axis by both tilting the first lens group counterclockwise with respect to the optical axis and moving that lens group down from the optical axis. Hence, even though the first lens group 1 is shifted, the image field of the original image 3 can be maintained substantially untilted and thus the entire image can be projected in focus onto a projection surface, for example, a screen S, that is parallel to a plane of the original image 3. Further, the brightness at edge portions of the image field is increased, compared with the conventional art.

The embodiments disclosed hereinafter satisfy conditions as follows:

$$0.01 < D/fw < 0.5 \quad (1)$$

wherein D is the distance between the front lens surface of the second group (the lens which is, in the second lens group, closest to the screen, or the long-distance conjugate) and the image field (or the shorter-distance conjugate); and fw is the focal length of the entire system at the wide-angle end.

Further, if the second lens group is a lens group having a positive refractive power, the first lens group should preferably be constructed so as to turn counterclockwise (if viewed as shown in the FIG. 1(A)) when the first lens group moves down below the optical axis of the second lens group, and so as to turn clockwise (if viewed as shown in FIG. 1(A)) when it moves up from the optical axis of the second lens group.

The following conditional expression preferably also should be satisfied:

$$0.5 < f2/fw < 3 \quad (2)$$

where f2 is the focal length of the second lens group.

Further, the following conditional expression preferably also should be satisfied:

$$0.5 < f2/d2 < 4.1 \quad (3)$$

where d2 is the size of an air-gap (or the thickness of an air lens) that is between the first lens group and the second lens group at the wide-angle end.

Still further, the following conditional expression preferably also should be satisfied:

$$0.5 < fw/f1 < 1 \quad (4)$$

where f1 is the focal length of the first lens group.

The first lens group is shifted by tilting it as well as moving it perpendicularly to the optical axis of the second lens group, in order to offset the tilting of the image field. The conditional expression (2) defines a preferred range for ratios of the focal length of the second lens group to the focal length of the entire system. If the ratio is lower than the lower limit of the range, the power of the second lens group becomes inconveniently great. As a result, telecentric conditions will not be satisfied, and the lens thickness of the second lens group becomes too great. If the ratio is higher than the upper limit, the power of the second lens group becomes inconveniently small. As a result, telecentric conditions are also not satisfied, and the tilt angle of the first lens group becomes too small to effectively offset the tilt of image curvature, thus causing an inconveniently large amount of vignetting of peripheral light.

The conditional expression (3) defines a preferred range for ratios between the focal length of the second lens group and the size of an air gap (or the thickness of an air lens) that is between the first and second lens groups. If the ratio is out of the range of the expression (3), telecentric conditions will not be satisfied.

Within the conditional expression (3), the most preferred upper value is 3 or a value near 3.

Figure 3A:
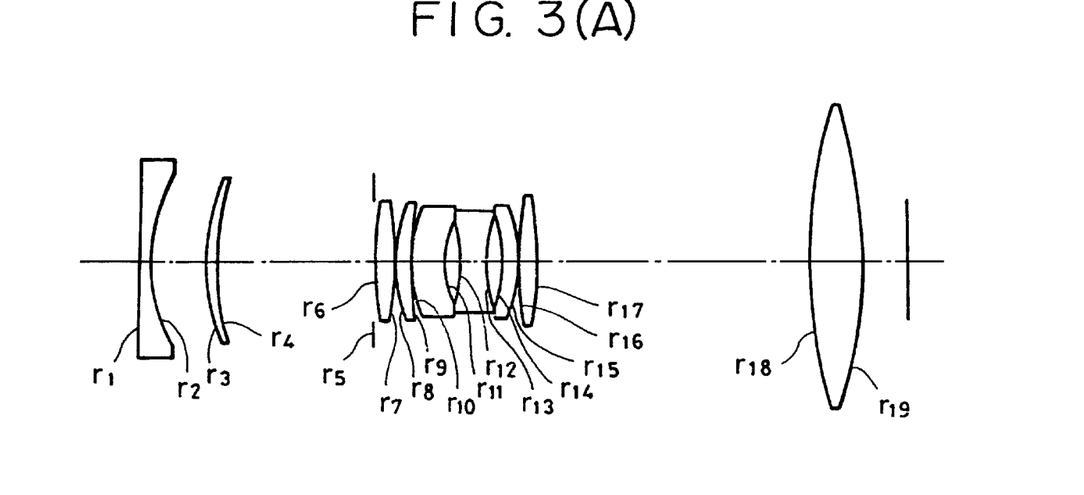
FIGS. 3(A) and 3(B) illustrate the lens arrangement and operation of one embodiment of a projection lens system of the present invention.
Figure 3B:
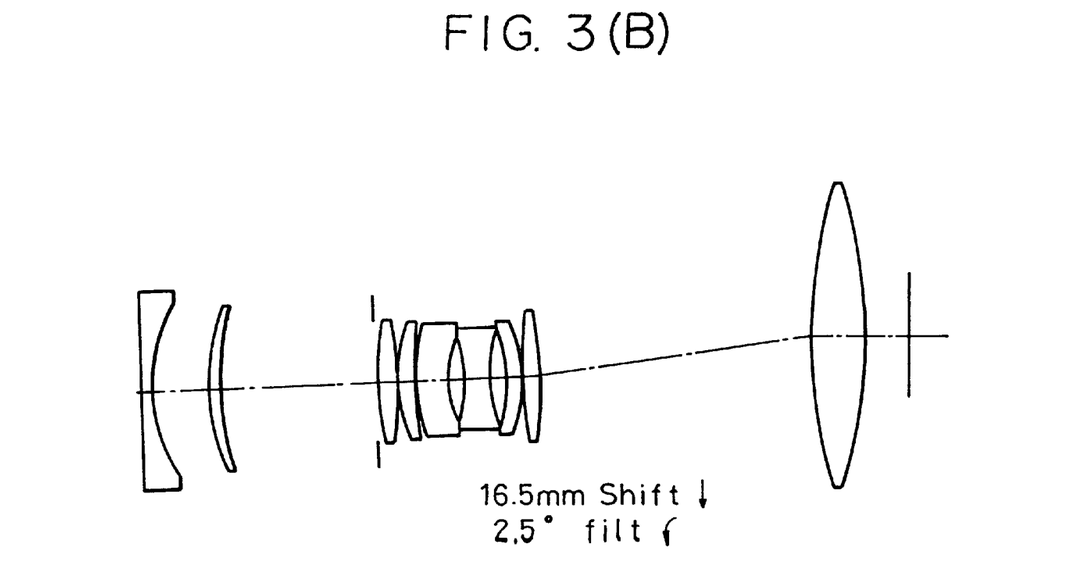
Figures 4A, 4B:
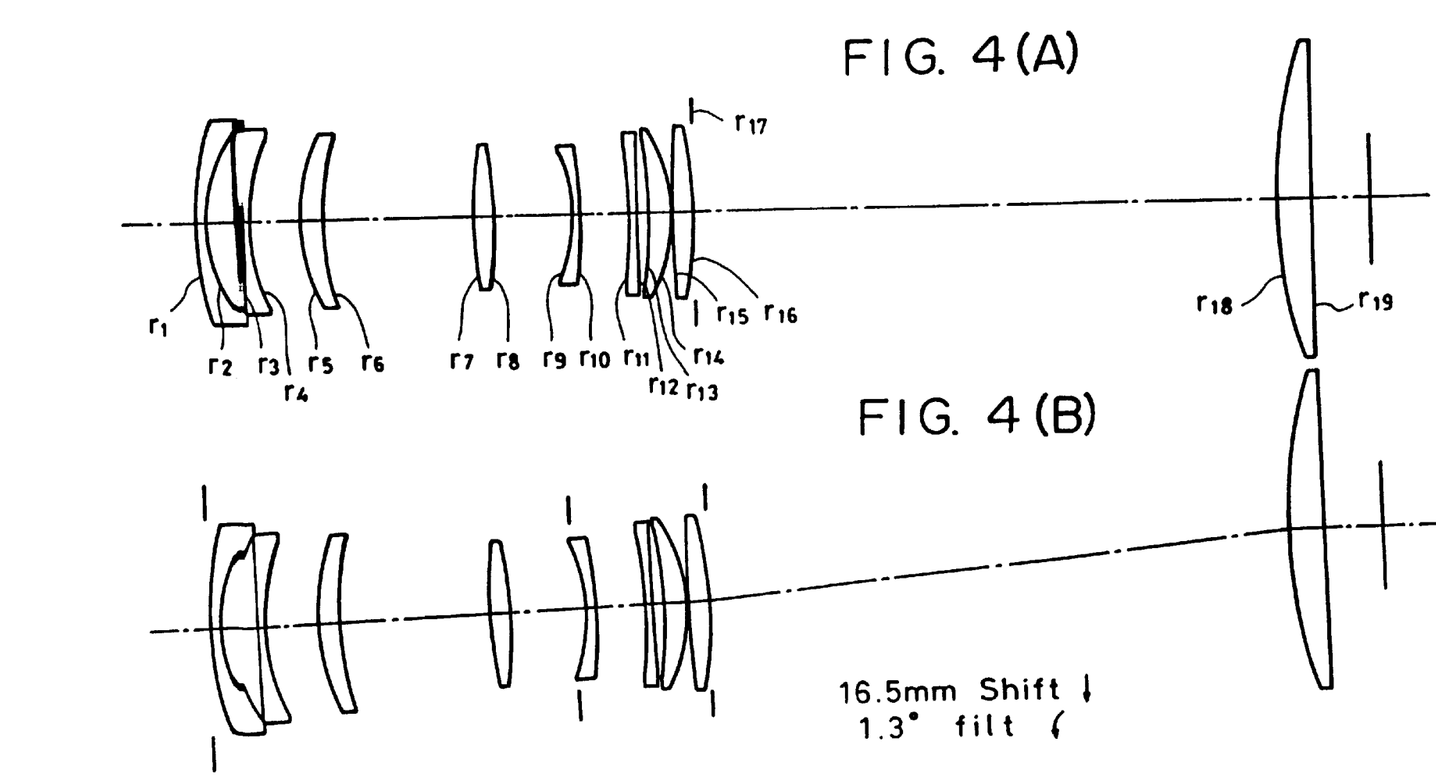
FIGS. 4(A) and 4(B) illustrate the lens arrangement and operation of another embodiment of a projection lens system of the present invention.

FIGS. 3(A), 3(B), 4(A) and 4(B) respectively show sectional views according to Examples 1 and 2, for which numerical values of each lens element are shown hereinafter in table form. FIGS. 3(A) and 4(A) show the lens arrangements when the shift of the first lens group is zero. FIGS. 3(B) and 4(B) show the lens arrangements when the perpendicular shift with respect to the optical axis of a stationary condenser lens of the first lens group is 16.5 mm. The counterclockwise tilts of the first lens groups shown in FIGS. 3(B) and 4(B) are 2.5° and 1.3°, respectively.

A mechanism to move and tilt a lens barrel according to the present invention will be described hereinafter with reference to FIGS. 6 and 7.

Figure 6:
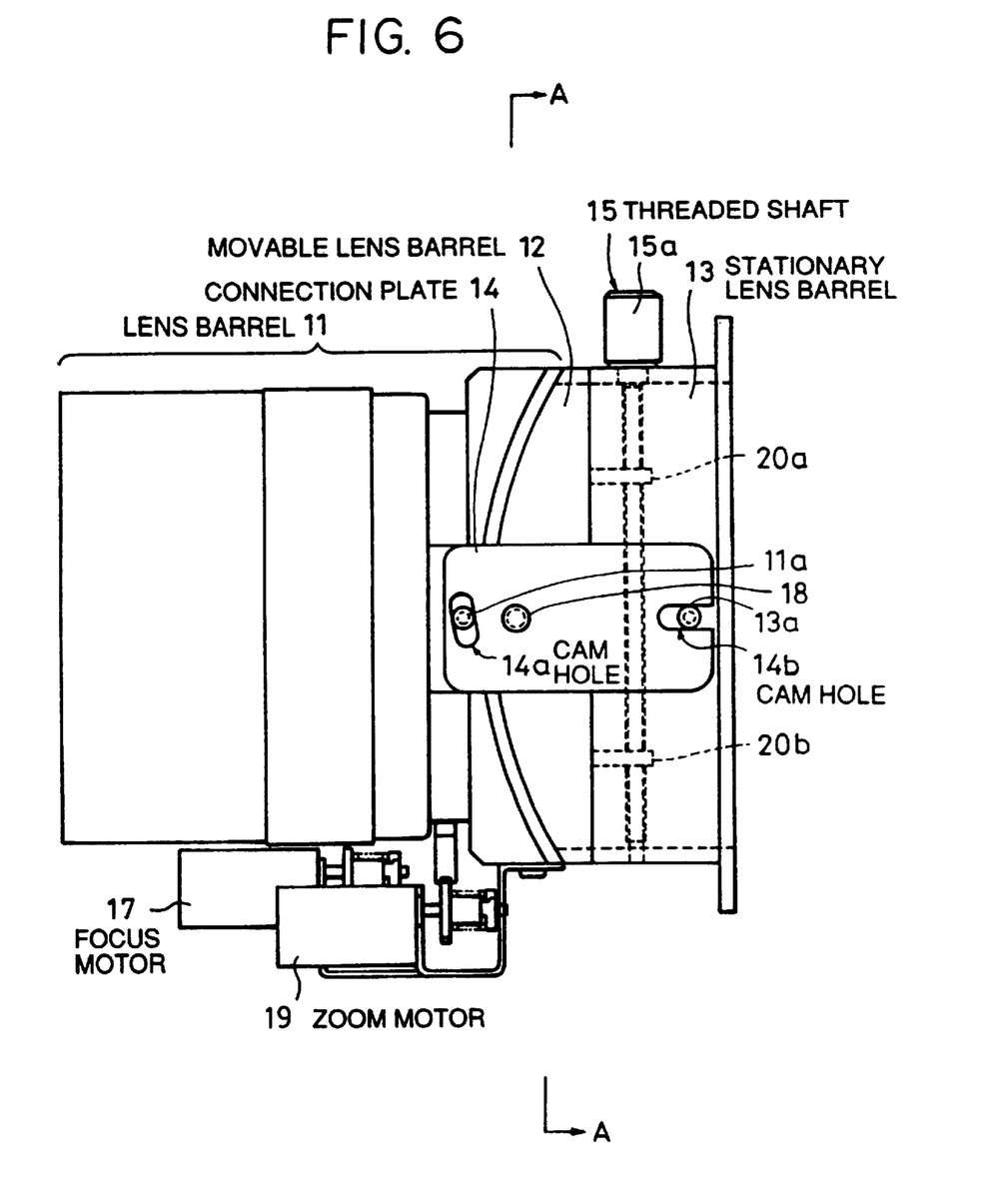
FIG. 6 illustrates a mechanism to move and tilt the first lens group of a projection lens system according to the present invention.

As shown in FIG. 6, the mechanism basically comprises: a lens barrel 11 which contains the first lens group 1; a movable lens barrel 12 that can be moved perpendicularly to the optical axis; a stationary lens barrel 13; a connection plate 14 connecting the lens barrel 11, the movable lens barrel 12 and the stationary lens barrel 13. The connection plate 14 is fixed to the movable lens barrel 12 by means of a fixing shaft 18, and has cam holes 14a and 14b which are slidably engaged with projections 11a and 13a formed on the lens barrel 11 and the stationary lens barrel 13, respectively. FIG. 6 further shows a focus motor 17 and a zoom motor 19.

Figure 7:
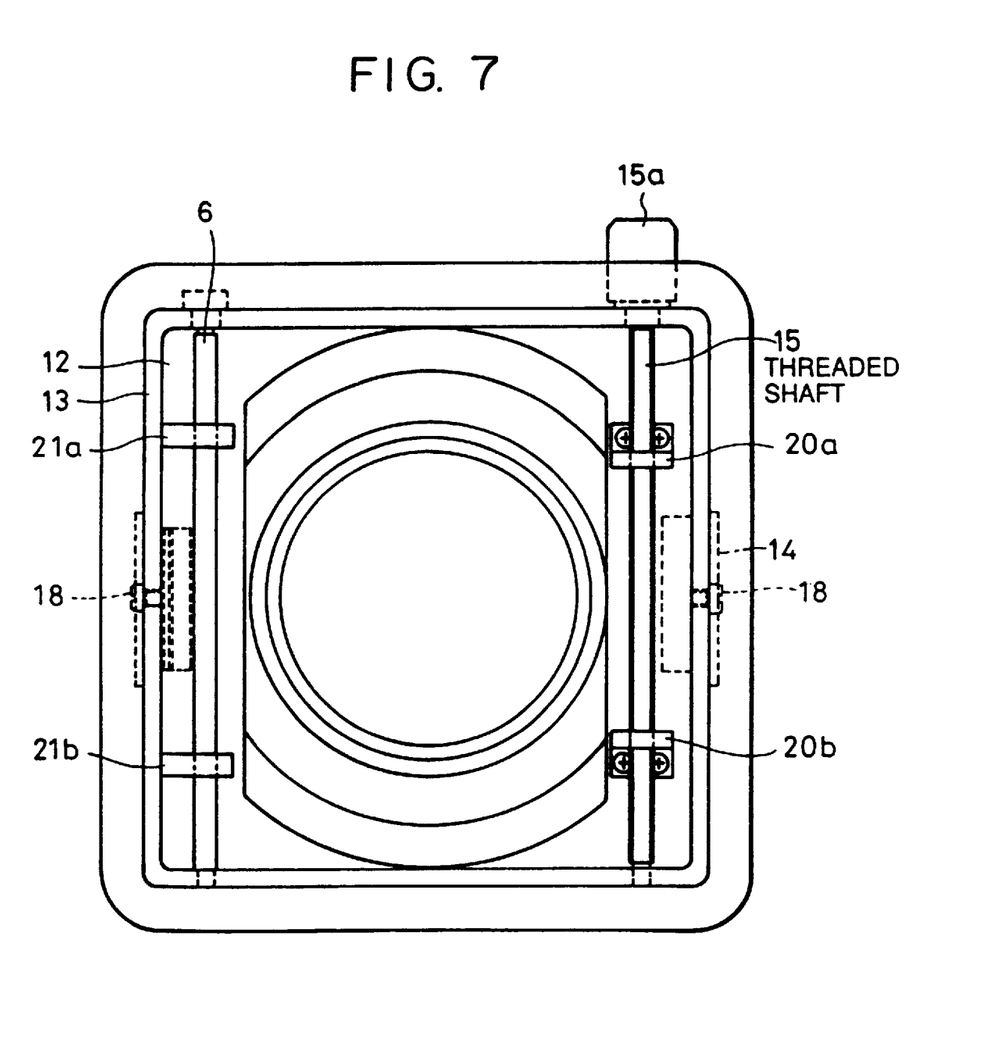
FIG. 7 is a view taken on the line A—A of FIG; 6.

FIG. 7 shows a front view taken along the line A—A of FIG. 6. The stationary lens barrel 13 has a guide bar 6 and a threaded shaft 15 for moving the movable lens barrel 12. The guide bar 6 and the threaded shaft 15 are slidably connected to connection members 20a, 20b, 21a and 21b formed on the movable lens barrel 12. The connection members 20a and 20b are threaded, thus being engaged with the threaded shaft 15.

In the mechanism thus constructed, when the threaded shaft 15 is rotated by means of an operating member 15a, the movable lens barrel 12 is moved perpendicularly to the optical axis, and the lens barrel 11 is tilted (or pivoted) along an arc-shape surface formed on the movable lens barrel 12.

According to the present invention, the tilt of the image field caused by a shift of the first lens group can be offset by tilting the second lens group instead of the first lens group. However, this method for offsetting the tilt of the field does not substantially increase the brightness of an edge portion of the image field. Further, according to the present invention, if the second lens group is a negative lens group, the tilt of the image field caused by a shift of the first lens group can be offset by substantially the same method as described above.

Numerical features for Example 1, as shown in FIGS. 3(A), 3(B), and Example 2, as shown in FIGS. 4(A), 4(B), of the present invention are given in the following tables. In the tables: ri is the curvature of the ith lens surface counting from the screen or long-distance conjugate side; di is the thickness of the ith glass or air lens counting from the screen side; ni is the refractive index of the ith glass lens counting from the screen side; and vi is the Abbe's number of the ith glass lens counting from the screen side.

EXAMPLE 1

TABLE 1

| fw = 104.02 | ft = 166.44 | fno = 1:3.8–4.8 | 2w = 51.2°–33.3° |
|---|---|---|---|
| r 1 = 1929.596 | d 1 = 3.85 | n 1 = 1.66966 | v 1 = 48.3 |
| r 2 = 64.554 | d 2 = 19.97 | | |
| r 3 = 78.744 | d 3 = 4.20 | n 2 = 1.81185 | v 2 = 25.4 |
| r 4 = 115.892 | d 4 = variable | | |
| r 5 = (stop) | d 5 = 0.50 | | |
| r 6 = 138.970 | d 6 = 6.50 | n 3 = 1.69948 | v 3 = 55.5 |
| r 7 = −163.844 | d 7 = 0.20 | | |
| r 8 = 52.603 | d 8 = 6.10 | n 4 = 1.69948 | v 4 = 55.5 |
| r 9 = 193.050 | d 9 = 0.20 | | |
| r10 = 64.648 | d10 = 11.32 | n 5 = 1.65175 | v 5 = 33.8 |
| r11 = 40.488 | d11 = 4.81 | | |
| r12 = −89.532 | d12 = 10.00 | n 6 = 1.73365 | v 6 = 28.5 |
| r13 = 60.510 | d13 = 5.47 | | |
| r14 = −56.603 | d14 = 6.36 | n 7 = 1.60524 | v 7 = 60.7 |
| r15 = −43.074 | d15 = 0.16 | | |
| r16 = 222.053 | d16 = 5.60 | n 8 = 1.51805 | v 8 = 64.2 |
| r17 = −134.791 | d17 = variable | | |
| r18 = 186.863 | d18 = 19.00 | n 9 = 1.51805 | v 9 = 64.2 |
| r19 = −167.457 | | | |

TABLE 2

| Focal-Length Variable Air Lens | 104.02 | 130.03 | 166.44 |
|---|---|---|---|
| d 4 | 54.65 | 25.61 | 0.19 |
| d17 | 95.00 | 112.80 | 137.73 |

TABLE 3

| Conditional Expression | | Value |
|---|---|---|
| 0.01 < D/fw < 0.5 | (1) | 0.302 |
| 0.5 < f2/fw < 3 | (2) | 1.669 |
| 0.5 < f2/d2 < 4.1 | (3) | 1.828 |
| 0.5 < fw/f1 < 1 | (4) | 0.894 |

EXAMPLE 2

TABLE 4

| fw = 104.1 | ft = 166.5 | fno = 1:3.8–4.8 | 2w = 51.2°–33.3° |
|---|---|---|---|
| r 1 = 107.552 | d 1 = 3.80 | n 1 = 1.60311 | v 1 = 60.7 |
| r 2 = 51.599 | d 2 = 9.47 | | |
| r 3 = 546.693 | d 3 = 3.00 | n 2 = 1.60311 | v 2 = 60.7 |
| r 4 = 67.168 | d 4 = 18.34 | | |
| r 5 = 69.754 | d 5 = 7.30 | n 3 = 1.80518 | v 3 = 25.4 |
| r 6 = 103.771 | d 6 = variable | | |
| r 7 = 132.689 | d 7 = 7.30 | n 4 = 1.58144 | v 4 = 40.8 |
| r 8 = −119.046 | d 8 = 26.10 | | |
| r 9 = −52.520 | d 9 = 2.50 | n 5 = 1.80518 | v 5 = 25.4 |
| r10 = −190.633 | d10 = 16.44 | | |
| r11 = −247.160 | d11 = 3.00 | n 6 = 1.76182 | v 6 = 26.5 |
| r12 = 1274.621 | d12 = 4.04 | | |
| r13 = −138.731 | d13 = 7.50 | n 7 = 1.60311 | v 7 = 60.7 |
| r14 = −55.617 | d14 = 0.20 | | |

TABLE 4-continued

| fw = 104.1 | ft = 166.5 | fno = 1:3.8–4.8 | 2w = 51.2°–33.3° |
|---|---|---|---|
| r15 = 353.457 | d15 = 7.25 | n 8 = 1.60311 | v 8 = 60.7 |
| r16 = −134.818 | d16 = variable | | |
| r17 = ∞ | d17 = variable | | |
| r18 = 175.601 | d18 = 12.00 | n 9 = 1.51633 | v 9 = 64.2 |
| r19 = ∞ | | | |

TABLE 5

| Focal-Length Variable Air Lens | 104.1 | 130.1 | 166.5 |
|---|---|---|---|
| d 6 | 50.47 | 26.01 | 4.61 |
| d16 | 0.00 | 32.65 | 78.35 |
| d17 | 198.00 | 198.00 | 198.00 |

TABLE 6

| Conditional Expression | | Value |
|---|---|---|
| 0.01 < D/fw < 0.5 | (1) | 0.271 |
| 0.5 < f2/fw < 3 | (2) | 3.267 |
| 0.5 < f2/d2 < 4.1 | (3) | 1.718 |
| 0.5 < fw/f1 < 1 | (4) | 0.929 |

As described above, a projection lens system according to the present invention comprises a first lens group provided near the screen, and a second lens group provided near the image field, wherein the first lens group is shifted by relatively moving the optical axis of the first lens group in a direction perpendicular with respect to the optical axis of the second lens group and also by relatively tilting the optical axis of the first lens group with respect to the optical axis of the second lens group. Thereby, the present invention achieves a small shift-type projection lens system which achieves good imaging characteristic and maintains substantial brightness at an edge portion of image field to be projected. Furthermore, because the size of the condenser lens (the second lens group) is substantially reduced, the lens weight and the production cost can be reduced.

While the present invention has been described with reference to what are presently considered to be the preferred embodiments, it is to be understood that the invention is not limited to disclosed embodiments. To the contrary, the invention is intended to cover various modifications and equivalent arrangements included within the spirit and scope of the appended claims.

What is claimed is:

1. A projection lens system comprising:

a first lens group of positive refractive power that is provided closer to a screen than is a second lens group;

a second lens group that is provided closer to an original image than is said first lens group; and means for both shifting said first lens group perpendicularly with respect to an optical axis of said second lens group and, when said first lens group is being shifted, also tilting said first lens group so as to turn said first lens group by a tilt angle with respect to the optical axis of said second lens group in order to offset tilting of an image field caused by shifting of said first lens group, wherein said projection lens system satisfies the following conditional expression:

$0.01 < D/fw < 0.50$ where fw is the focal length of said projection lens system at a wide-angle end, and D is the distance between the original image and a lens surface of said second lens group which is closest to the screen, and wherein said second lens group is stationary and has a positive refractive power, and said means for shifting and tilting causes said first lens group to turn counterclockwise, when viewed from a direction where the first and second lens groups are arranged in that order from left to right, when said first lens group is moved downward with respect to the optical axis of said second lens group.

2. A projection lens system comprising:

a first lens group of positive refractive power that is provided closer to a screen than is a second lens group;

a second lens group that is provided closer to an original image than is said first lens group; and means for both shifting said first lens group perpendicularly with respect to an optical axis of said second lens group and, when said first lens group is being shifted, also tilting said first lens group so as to turn said first lens group by a tilt angle with respect to the optical axis of said second lens group in order to offset tilting of an image field caused by shifting of said first lens group, wherein said projection lens system satisfies the following conditional expression:

$0.01 < D/fw < 0.50$ where fw is the focal length of said projection lens system at a wide-angle end, and D is the distance between the original image and a lens surface of said second lens group which is closest to the screen, and which further satisfies the following conditional expression:

$0.5 < f2/fw < 3.0$ where f2 is the focal length of said second lens group.

3. A projection lens system according to claim 2, which further satisfies the following conditional expression:

$0.5 < f2/d2 < 4.1$ where d2 is the length of an air gap between said first lens group and said second lens group when said projection lens system is at the wide-angle end.

4. A projection lens system comprising:

a first lens group of positive refractive power that is provided closer to a screen than is a second lens group;

a second lens group that is provided closer to an original image than is said first lens group; and means for both shifting said first lens group perpendicularly with respect to an optical axis of said second lens group and, when said first lens group is being shifted, also tilting said first lens group so as to turn said first lens group by a tilt angle with respect to the optical axis of said second lens group in order to offset tilting of an image field caused by shifting of said first lens group, wherein said projection lens system satisfies the following conditional expression:

$0.01 < D/fw < 0.50$ where fw is the focal length of said projection lens system at a wide-angle end, and D is the distance between the original image and a lens surface of said second lens group which is closest to the screen, and which further satisfies the following conditional expression:

$0.5 < f2/d2 < 4.1$ where f2 is the focal length of said second lens group and d2 is the length of an air gap between said first lens group and said second lens group when said projection lens system is at the wide-angle end.

5. A projection lens system according to claim 4, wherein the following condition is satisfied:

$0.5 < f2/d2 < 3.$

6. A projection lens system comprising:

a first lens group of positive refractive power that is provided closer to a screen than is a second lens group;

a second lens group that is provided closer to an original image than is said first lens group; and means for both shifting said first lens group perpendicularly with respect to an optical axis of said second lens group and, when said first lens group is being shifted, also tilting said first lens group so as to turn said first lens group by a tilt angle with respect to the optical axis of said second lens group in order to offset tilting of an image field caused by shifting of said first lens group, wherein said projection lens system satisfies the following conditional expression:

$0.01 < D/fw < 0.50$ where fw is the focal length of said projection lens system at a wide-angle end, and D is the distance between the original image and a lens surface of said second lens group which is closest to the screen, and which further satisfies the following conditional expression:

$0.5 < fw/f1 < 1$ where f1 is the focal length of said first lens group.

7. A projection lens system comprising:

a first lens group of positive refractive power that is provided closer to a screen than is a second lens group;

a second lens group that is provided closer to an original image than is said first lens group; and means for both shifting said first lens group perpendicularly with respect to an optical axis of said second lens group and, when said first lens group is being shifted, also tilting said first lens group so as to turn said first lens group by a tilt angle with respect to the optical axis of said second lens group in order to offset tilting of an image field caused by shifting of said first lens group, which further satisfies the following conditional expression:

$0.5 < f2/fw < 3.0$ where f2 is the focal length of said second lens group and fw is the focal length of said projection lens system at a wide-angle end.

8. A projection lens system according to claim 7, further comprising:

a shifting lens barrel capable of shifting with respect to the optical axis; and a lens barrel which tilts relative to said shifting lens barrel,
wherein said first lens group is held by said lens barrel which tilts.

9. A projection lens system comprising:

a first lens group of positive refractive power that is provided closer to a screen than is a second lens group;

a second lens group that is provided closer to an original image than is said first lens group; and means for both shifting said first lens group perpendicularly with respect to an optical axis of said second lens group and, when said first lens group is being shifted, also tilting said first lens group so as to turn said first lens group by a tilt angle with respect to the optical axis of said second lens group in order to offset tilting of an image field caused by shifting of said first lens group, which further satisfies the following conditional expression:

$$0.5 < f2/d2 < 4.1$$

where f2 is the focal length of said second lens group and d2 is the length of an air gap between said first lens group and said second lens group when said projection lens system is at the wide-angle end.

10. A projection lens system according to claim 9, wherein the following condition is satisfied:

$$0.5 < f2/d2 < 3.$$

11. A projection lens system comprising:

a first lens group of positive refractive power that is provided closer to a screen than is a second lens group;

a second lens group that is provided closer to an original image than is said first lens group; and means for both shifting said first lens group perpendicularly with respect to an optical axis of said second lens group and, when said first lens group is being shifted, also tilting said first lens group so as to turn said first lens group by a tilt angle with respect to the optical axis of said second lens group in order to offset tilting of an image field caused by shifting of said first lens group, which further satisfies the following conditional expression:

$$0.5 < fw/f1 < 1$$

where fw is the focal length of said projection lens system at a wide-angle end and f1 is the focal length of said first lens group.

12. A projection lens system comprising:

a first lens group of positive refractive power that is provided closer to a screen than is a second lens group;

a second lens group that is provided closer to an original image than is said first lens group; and means for shifting and tilting said first lens group with respect to an optical axis of said second lens group, wherein said projection lens system satisfies the following conditional expression:

$$0.01 < D/fw < 0.50$$

where fw is the focal length of said projection lens system at a wide-angle end, and D is the distance between the original image and a lens surface of said second lens group which is closest to the screen, and wherein said second lens group is stationary and has a positive refractive power, and said means for shifting and tilting causes said first lens group to turn counterclockwise, when viewed from a direction where the first and second lens groups are arranged in that order from left to right, when said first lens group is moved downward with respect to the optical axis of said second lens group.

13. A projection lens system comprising:

a first lens group of positive refractive power that is provided closer to a screen than is a second lens group;

a second lens group that is provided closer to an original image than is said first lens group; and means for both shifting and at the same time tilting said first lens group with respect to an optical axis of said second lens group, wherein said projection lens system satisfies the following conditional expression:

$$0.01 < D/fw < 0.50$$

where fw is the focal length of said projection lens system at a wide-angle end, and D is the distance between the original image and a lens surface of said second lens group which is closest to the screen, wherein said projection lens system further satisfies the following conditional expression:

$$0.5 < f2/fw < 3.0$$

where f2 is the focal length of said second lens group, and wherein said second lens group is stationary.

* * * * *

UNITED STATES PATENT AND TRADEMARK OFFICE
CERTIFICATE OF CORRECTION

PATENT NO. : 5,926,316

DATED : July 20, 1999

INVENTOR(S) : Saburo SUGAWARA

It is certified that error appears in the above-identified patent and that said Letters Patent is hereby corrected as shown below:

COLUMN 2:

Line 45, "Then" should read --When--.

COLUMN 5:

Line 6, "vi" should read --$\nu$i--.

COLUMN 10:

Line 48, "wherein" should begin a new paragraph.

Signed and Sealed this

Fifth Day of December, 2000

Attest:

Q. TODD DICKINSON

Attesting Officer

Director of Patents and Trademarks